(12) United States Patent
Emlemdi

(10) Patent No.: US 7,528,084 B2
(45) Date of Patent: May 5, 2009

(54) DURABLE FUNCTIONAL GLASS ENAMEL COATING FOR AUTOMOTIVE APPLICATIONS

(75) Inventor: Hasan B. Emlemdi, Hamilton, OH (US)

(73) Assignee: The Shepherd Color Company, Cincinnati, OH (US)

( * ) Notice: Subject to any disclaimer, the term of this patent is extended or adjusted under 35 U.S.C. 154(b) by 438 days.

(21) Appl. No.: 11/342,790

(22) Filed: Jan. 30, 2006

(65) Prior Publication Data

US 2006/0172876 A1    Aug. 3, 2006

Related U.S. Application Data

(60) Provisional application No. 60/649,203, filed on Feb. 2, 2005.

(51) Int. Cl.
*C03C 3/062* (2006.01)
*C03C 8/02* (2006.01)
*C03C 3/095* (2006.01)
*C03C 3/064* (2006.01)
*C03C 3/068* (2006.01)
*C03C 3/097* (2006.01)

(52) U.S. Cl. ............... 501/73; 501/21; 501/63; 501/64; 501/78

(58) Field of Classification Search .......... 501/21, 501/63, 64, 73, 77, 78
See application file for complete search history.

(56) References Cited

U.S. PATENT DOCUMENTS

| | | | |
|---|---|---|---|
| 4,537,862 A | 8/1985 | Francel et al. | |
| 4,554,258 A | 11/1985 | Francel | |
| 4,859,637 A * | 8/1989 | Roberts | 501/79 |
| 4,970,178 A * | 11/1990 | Klimas et al. | 501/26 |
| 5,244,848 A * | 9/1993 | Clifford et al. | 501/66 |
| 5,252,521 A | 10/1993 | Roberts | |
| 5,629,247 A | 5/1997 | Prunchak | |
| 5,677,251 A | 10/1997 | Sakoske | |
| 5,714,420 A | 2/1998 | Sakoske et al. | |
| 6,105,394 A | 8/2000 | Sridharan et al. | |
| 6,599,852 B2 * | 7/2003 | Kondo et al. | 501/42 |
| 2005/0037913 A1 * | 2/2005 | Peuchert et al. | 501/78 |

OTHER PUBLICATIONS

Musick, Michael D. et al., Core-shell composite inorganic pigments and method of preparation for crystallizable glass frit compositions, U.S. Appl. No. 60/658,510, filed Mar. 2, 2005.
Houmes, Joel D. et al., Silicon alloys materials as silver migration inhibitors, U.S. Appl. No. 60/663,780, filed Mar. 21, 2005.

* cited by examiner

*Primary Examiner*—Jerry Lorengo
*Assistant Examiner*—Matthew E Hoban
(74) *Attorney, Agent, or Firm*—Frost Brown Todd LLC

(57) ABSTRACT

The present invention provides glass compositions and glass coatings that are lead-free and cadmium-free for use on glass substrates, particularly in automotive applications. The compositions of the present invention provide for chemically durable, blacker colors that are completely suitable for use in automotive glass windows. The compositions include tantalum oxide as a required component.

14 Claims, No Drawings

DURABLE FUNCTIONAL GLASS ENAMEL COATING FOR AUTOMOTIVE APPLICATIONS

CROSS-REFERENCE TO RELATED APPLICATION

This application is based upon and claims priority from U.S. Provisional Patent Application No. 60/649,203, Emlemdi, filed Feb. 2, 2005, incorporated herein by reference.

FIELD OF THE INVENTION

The present invention provides a new and improved durability, environmentally friendly and functional glass enamel system for use on glass substrates in automotive coating applications. The present invention is particularly well suited for making dark, high opacity borders in the perimeter of automotive windows.

BACKGROUND OF THE INVENTION

Numerous glass enamel compositions that are lead-free and cadmium-free are known in the prior art. The present invention, however, is particularly well suited for use in the automotive industry for making dark, high opacity borders in the perimeter of automotive windows.

There is a great deal of art relating to lead- and cadmium-free durable glass compositions, and lead- and cadmium-free durable glass enamel compositions, as well as the processing and treatment of those compositions.

In general, lead-free and cadmium-free glasses and glass enamel compositions reported in the prior art can be categorized into two major groups. One group is referred to as zinc-boro-silicate glasses. This type of glass, even those said to have improved durability, are often relatively weak in weathering the elements. The other major group can easily be distinguished by its significant bismuth content. Each of those two broadly categorized groups can be subdivided into several subgroups by those familiar with the glass coatings industry. The present invention is from the latter group. It contains significant amounts of bismuth oxide, but also requires different proportions and unique addition of other compounds.

An example of a prior art lead-free glass enamel may be found in Francel et al., U.S. Pat. No. 4,537,862, issued Aug. 27, 1985. Francel et al. discloses a glass enamel including a frit comprising by weight 25-32% $SiO_2$, 25-32% $B_2O_3$, 10-18% $ZrO_2$, 0-9% $Na_2O$, 0-5% $K_2O$, 0-9% $Li_2O$, 0-2% $SnO_2$, 0-3% CaO, 0-6% SrO, and 10-18% rare earth oxide, wherein the ratio of $ZrO_2$ to rare earth oxide is about 1:1 to about 1.4:1, the amount of $ZrO_2$ plus rare earth oxide is about 20% to about 33%, and the amount of $Li_2O$, $K_2O$ and $Na_2O$ is about 1% to about 10%. Another patent relevant to this invention is U.S. Pat. No. 4,554,258, Francel, issued Nov. 19, 1985, which discloses a glass enamel including a frit comprising by weight 48-57% $Bi_2O_3$, 29-38% $SiO_2$, 3-8% $B_2O_3$, 0-3% ZnO, 0-8% $ZrO_2$, total of 2-8% $R_2O$ (that includes $Na_2O$, $K_2O$, and $Li_2O$), 0-2% $TiO_2$, 0-8% CaO, 0-4% BaO, and 0-2% $Al_2O_3$.

U.S. Pat. No. 5,252,521, Roberts, issued Oct. 12, 1993, discloses a composition by weight comprising 35-77% $Bi_2O_3$, 0-9% $SiO_2$, 10-33% $B_2O_3$, 10-32% ZnO, 0-10% ZrO2, 0-6% $K_2O$, 0-15% $Sb_2O_3$, 0-8% CaO, 0-15% BaO, and 0-4% $Al_2O_3$.

U.S. Pat. No. 5,629,247, Prunchak, issued May 13, 1997, discloses another $Bi_2O_3$ and ZnO—containing composition by weight comprising 50-75% $Bi_2O_3$, 15-25% $SiO_2$, 4-10% $B_2O_3$, 2-10% ZnO, a total of 1-4% $R_2O$ (that includes $Na_2O$, $K_2O$, and $Li_2O$), less than 2% $TiO_2$, less than 2% BaO, 0-4% $ZrO_2$, and 0-4% CaO.

Several patents describe partially crystallizing enamels. An example is U.S. Pat. No. 5,677,251, Sakoske, issued Oct. 14, 1997, disclosing a composition by weight comprising 0-15% $Bi_2O_3$, 10-25% $SiO_2$, 20-40% $B_2O_3$, 10-50 ZnO, 0-2% $ZrO_2$, 7-10% $Na_2O$, 0-2% BaO, 0-10% CaO, 0-2% $F_2$, and 0-5% $Al_2O_3$. U.S. Pat. No. 5,714,420, Sakoske, issued Feb. 3, 1998, discloses a composition by weight comprising 10-50% $Bi_2O_3$, 20-35% $SiO_2$, 5-15% $B_2O_3$, 5-45% ZnO, 0-2% $ZrO_2$, 1-7% $Na_2O$, 0-2% $TiO_2$, 0-10% CaO, 0-1% $F_2$, and 0-5% $Al_2O_3$.

The present invention is unique in that it requires the presence of $Ta_2O_5$ (tantalum oxide). This compound, no matter how it is added to the glass composition, is shown to improve many of the properties of the glass product and is therefore deemed essential. Furthermore, the present invention is also unique as it does not require the presence of $Nb_2O_5$, although $Nb_2O_5$ may be included as an optional component.

A more recent example of a prior art lead-free glass enamel may be found in Sridharan et al., U.S. Pat. No. 6,105,394, issued Aug. 22, 2000. Sridharan et al. disclose a lead-free glass enamel including a frit comprising by weight 20-80% $Bi_2O_3$, 12-45% $SiO_2$, 0.5-1% $B_2O_3$, total of less than 3% $R_2O$ (that includes $Na_2O$, $K_2O$, and $Li_2O$), less than 3% ZnO, and 0.1-15% $Nb_2O_5$.

SUMMARY OF THE INVENTION

The present invention relates to lead-free, cadmium-free glass frit compositions comprising (in percent by weight) from about 8% to about 45% $SiO_2$, up to about 7% ZnO, up to about 4% $B_2O_3$, from about 40% to about 80% $Bi_2O_3$, up to about 4% $Na_2O$, up to about 8% $K_2O$, up to about 4% $Li_2O$, from about 0.1% to about 22% $Ta_2O_5$, up to about 1% $Nb_2O_5$, up to about 4% of each of $Al_2O_3$, $TiO_2$, $ZrO_2$, and BaO, up to about 1% of each of SrO, $Sb_2O_3$, MgO, $P_2O_5$, $Mo_2O_3$, and CaO, up to about 3% $F_2$, and up to about 4% of one or more of $La_2O_3$, $Nd_2O_3$, $Pr_2O_3$ and $Ce_2O_3$.

Glass enamel compositions comprising the defined glass frit compositions are also disclosed.

DETAILED DESCRIPTION OF THE INVENTION

In addition to being a lead-free and cadmium-free glass frit or glass enamel composition, the present invention is unique in that it requires the presence of $Ta_2O_5$. The utilization of $Ta_2O_5$ brings several beneficial qualities to the glass composition and to the glass enamel paint. For example, it has been observed that the addition of $Ta_2O_5$ provides a softer glass system. Such effect provides better color development at a given temperature, as well as higher gloss values. Other benefits include the formation of a clearer and more durable glass.

The present invention also provides a method for producing a glass coating product system. Such a system comprises the making of two or more glass frits, the incorporation of two or more inorganic pigments, and the making of glass enamel paint via the dispersion into an organic vehicle. Such process is well known to those skilled in the art.

In a broad range, the glass composition of the present invention includes one or more glass frits comprising, in weight percent, from about 8% to about 45% $SiO_2$; up to about 7% ZnO (i.e., from 0 to about 7%); up to about 4% $B_2O_3$; from about 40% to about 80% $Bi_2O_3$; up to about 4%

$Na_2O$; up to about 8% $K_2O$; up to about 4% $Li_2O$; up to about 1% $Nb_2O_5$; from about 0.1% to about 22% $Ta_2O_5$; up to about 4% of each of $Al_2O_3$, $TiO_2$, $ZrO_2$, and BaO; up to about 1% of each of MgO, $P_2O_5$, CaO, $Mo_2O_3$, $Sb_2O_3$, and SrO; up to about 3% $F_2$; and up to about 4% of one or more of $La_2O_3$, $Nd_2O_3$, $Pr_2O_3$ or $Ce_2O_3$.

In an intermediate range, the glass composition of the present invention includes one or more glass frits comprising, in weight percent, from about 11% to about 35% $SiO_2$; from about 0.25% to about 5% ZnO; up to about 2% $B_2O_3$; from about 45% to about 75% $Bi_2O_3$; up to about 2% $Na_2O$; from about 0.1% to about 5% $K_2O$; from about 0.25% to about 2% $Li_2O$; from about 0.1% to about 16% $Ta_2O_5$; from about 0.1% to about 3% $Al_2O_3$; up to about 1% $Nb_2O_3$; from about 0.1% to about 2% $F_2$; from about 0.25% to about 2% BaO; up to about 2% of each of $TiO_2$ and $ZrO_2$; and from about 0.1% to about 3% of one or more of $La_2O_3$, $Nd_2O_3$, $Pr_2O_3$ or $Ce_2O_3$.

In a more narrow range, the glass composition of this invention includes one or more glass frits comprising in weight percent from about 16% to about 25% $SiO_2$; from about 1% to about 4% ZnO; from about 54% to about 71% $Bi_2O_3$; from about 0.25% to about 3% $K_2O$; up to about 1% $Nb_2O_3$; from about 0.50% to about 1% $Li_2O$; from about 0.25% to about 11% $Ta_2O_5$; from about 0.25% to about 1% $Al_2O_3$; from about 0.1% to about 1% $F_2$; from about 0.5% to about 1% BaO; and from about 0.25% to about 2% of one or more of $La_2O_3$, $Nd_2O_3$, $Pr_2O_3$ or $Ce_2O_3$.

In each of the broad, intermediate and more narrow ranges, the products of this invention may include, as an optional component, one or more of the coloring oxides (including, but not limited, to CuO, $Co_2O_3$, $MnO_2$, $Fe_2O_3$, NiO, $Cr_2O_3$, $V_2O_5$) to provide color and other desired properties to the finished product. The ranges at which these materials are generally used, as well as the materials themselves, are well known to those skilled in the art; exemplary ranges are set forth in the table, below.

As used herein, "up to about X % of one or more of A, B, C . . . " means that the total of the levels of A, B and C cannot exceed about X %. The phrase "up to about X % of each of A, B, C . . . " means that each of A, B and C can be included at levels of up to about X %.

Glass frit made in accordance with the principles of the present invention is processed using procedures well established in the art of frit making. Frits according to the present invention can be prepared by mixing together the proper raw materials which are well known to those skilled in the art. The raw materials are then melted in a furnace prepared for glass making or in sintered fused silica crucibles at temperatures between about 1900° F. (1038° C.) and about 2250° F. (1232° C.) for about one hour to one and a half hours. The molten glass can be quenched into a water pool with the help of a stream of water, which is known as a "water quench" process, or quenched through two water-cooled metal drums which is known as a "roll quench" process. The frits produced are then ground and dried into a suitable average particle size dry flux. Such techniques are well known to those skilled in the art.

The glass enamel aspect of this invention includes the utilization of two or more of the glass fluxes described above in the making of enamel to suit the intended application. An enamel paste is made by adding the dry fluxes and other needed pigments into conventional screen printing vehicle. Such paste is then applied to the glass substrate via screen printing. Again, such techniques are well known to those skilled in the art. The products of this invention are suitable for various commercial glass coating applications, particularly in the automotive industry for the making of dark, high opacity borders frequently found in the perimeter of the automotive windows. This invention provides much improved chemical durability to those compositions.

| | | Broad Range | | Intermediate Range | | Narrow Range | |
|---|---|---|---|---|---|---|---|
| | | from | to | from | to | from | to |
| $Li_2O$ | Lithium oxide | 0.00 | 4.00 | 0.25 | 2.00 | 0.50 | 1.00 |
| $K_2O$ | Potassium oxide | 0.00 | 8.00 | 0.10 | 5.00 | 0.25 | 3.00 |
| $Na_2O$ | Sodium oxide | 0.00 | 4.00 | 0.00 | 2.00 | | |
| CaO | Calcium oxide | 0.00 | 1.00 | | | | |
| MgO | Magnesium oxide | 0.00 | 1.00 | | | | |
| SrO | Strontium oxide | 0.00 | 1.00 | | | | |
| BaO | Barium oxide | 0.00 | 4.00 | 0.25 | 2.00 | 0.50 | 1.00 |
| ZnO | Zinc oxide | 0.00 | 7.00 | 0.25 | 5.00 | 1.00 | 4.00 |
| $Al_2O_3$ | Aluminum oxide | 0.00 | 4.00 | 0.10 | 3.00 | 0.10 | 1.00 |
| $B_2O_3$ | Boron trioxide | 0.00 | 4.00 | 0.00 | 2.00 | | |
| $P_2O_5$ | Phosphorous oxide | 0.00 | 1.00 | | | | |
| $Sb_2O_3$ | Antimony trioxide | 0.00 | 1.00 | | | | |
| $SiO_2$ | Silica | 8.00 | 45.00 | 11.00 | 35.00 | 16.00 | 25.00 |
| $TiO_2$ | Titanium dioxide | 0.00 | 4.00 | 0.00 | 2.00 | | |
| $ZrO_2$ | Zirconium dioxide | 0.00 | 4.00 | 0.00 | 2.00 | | |
| $F_2$ | Fluorine | 0.00 | 3.00 | 0.10 | 2.00 | 0.10 | 1.00 |
| $Bi_2O_3$ | Bismuth trioxide | 40.00 | 80.00 | 45.00 | 75.00 | 54.00 | 71.00 |
| $Ta_2O_5$ | Tantalum oxide | 0.10 | 22.00 | 0.10 | 16.00 | 0.25 | 11.00 |
| $Nb_2O5$ | Niobium oxide | 0.00 | 1.00 | | | | |
| $Mo_2O_3$ | Molybdenum trioxide | 0.00 | 1.00 | | | | |
| $Ce_2O_3$ | Cerium oxide | 0.00 | 4.00 | 0.10 | 3.00 | 0.25 | 2.00 |
| $Nd_2O_3$ | Neodymium trioxide | | | | | | |
| $La_2O_3$ | Lanthanum oxide | | | | | | |
| $Pr_2O_3$ | Praseodymium trioxide | | | | | | |

-continued

|  |  | Broad Range | | Intermediate Range | | Narrow Range | |
|---|---|---|---|---|---|---|---|
|  |  | from | to | from | to | from | to |
| $V_2O_5$ | Vanadium pentoxide | These are optional coloring oxides. | | | | | |
| $Cr_2O_3$ | Chromium oxide | 0.00 | 30.00 | 2.50 | 20.00 | 5.00 | 18.00 |
| $MnO_2$ | Manganese dioxide | | | | | | |
| $Co_2O_3$ | Cobalt oxide | | | | | | |
| CuO | Copper oxide | | | | | | |
| $Fe_2O_3$ | Iron oxide | | | | | | |
| NiO | Nickel oxide | | | | | | |

EXAMPLES

| | | Formulation Examples | | | | | |
|---|---|---|---|---|---|---|---|
| | EXAMPLES | 1 | 2 | 3 | 4 | 5 | 6 |
| $Li_2O$ | Lithium oxide | 0.50 | 0.75 | 2.00 | 0.80 | 1.00 | 1.60 |
| $K_2O$ | Potassium oxide | 1.00 | 1.05 | | 1.00 | 1.00 | |
| BaO | Barium oxide | 1.50 | 1.00 | 1.00 | 1.00 | 1.00 | 0.80 |
| ZnO | Zinc oxide | 2.50 | 5.00 | 2.50 | 5.00 | | 2.00 |
| $Al_2O_3$ | Aluminum oxide | 0.25 | 0.10 | 0.25 | 0.10 | | 0.20 |
| $SiO_2$ | Silica | 25.00 | 22.00 | 25.00 | 22.00 | 22.90 | 20.00 |
| $F_2$ | Fluorine | 0.10 | 0.25 | 0.10 | 0.25 | 0.30 | 0.10 |
| $Bi_2O_3$ | Bismuth trioxide | 68.65 | 67.55 | 68.60 | 67.55 | 71.50 | 54.80 |
| $Ta_2O_5$ | Tantalum oxide | 0.25 | 2.00 | 0.25 | 1.00 | 2.00 | 0.25 |
| $Nb_2O_5$ | Niobium oxide | | | | 1.00 | | |
| $Ce_2O_3$ | Cerium oxide | 0.25 | 0.30 | 0.30 | 0.30 | 0.30 | 0.25 |
| $Nd_2O_3$ | Neodymium trioxide | | | | | | |
| $La_2O_3$ | Lanthanum oxide | | | | | | |
| $Pr2O_3$ | Praseodymium trioxide | | | | | | |
| $V_2O_5$ | Vanadium pentoxide | 0.00 | 0.00 | 0.00 | 0.00 | 0.00 | 20.00 |
| $Cr_2O_3$ | Chromium oxide | | | | | | |
| $MnO_2$ | Manganese dioxide | | | | | | |
| $Co_2O_3$ | Cobalt oxide | | | | | | |
| CuO | Copper oxide | | | | | | |
| | Total | 100.00 | 100.00 | 100.00 | 100.00 | 100.00 | 100.00 |

The formulations given above are made by selecting and combining raw materials that yield the desired empirical oxide formulas. No intentional addition of lead or lead oxide is utilized. The batches of raw materials can be mixed, melted, fritted, ground and further processed into glass enamels. The procedures are well known in the art of making glass frits and glass enamels.

This invention allows for the formulation of glass frit(s) having a suitable coefficient of thermal expansion (CTE) from about $65 \times 10^{-7}/°$ C. to about $90 \times 10^{-7}/°$ C. Some glass frit(s) made within the allowable limits of this invention would have CTE of up to about $97 \times 10^{-7}/°$ C. Generally, such glasses are utilized either in conjunction with other glasses having lower CTE and / or with certain system modifiers in order to allow for proper and safe final application. In all, such CTE values, in addition to this invention's lowered "improved" glass frit(s) maturation temperature, allow the enamels of this invention to be applied at workable firing temperatures with minimal thermal stresses built up between the enamels and the glass substrate to which the products are applied. Those values are comparable to established workable products in the field as shown in the following table, which lists Coefficient of Thermal Expansion (CTE), Glass Transition Temperature (Tg) and Softening Point (SP) of several commercial glasses available from Glass Coating & Concepts (GCC), Monroe, Ohio. This table also lists the properties of a typical example of the present invention.

| | CTE ($10^{-7}/$ ° C.) | Tg (° C.) | SP (° C.) | Overall Durability |
|---|---|---|---|---|
| GF 543* | 60-85 | 440-448 | 475-495 | Moderate-Weak |
| GF 584** | 65-90 | 440-482 | 480-500 | Weak |
| GF 602*** | 60-85 | 460-495 | 510-535 | Good |
| Product(s) of current invention | 65-97 | 425-460 | 475-510 | Best |

*GF 543, Traditional leaded frit sold by GCC
**GF-584, Lead-free, nondurable, zinc-borosilicate glass frit sold by GCC
***GF-602, Lead free, durable, bismuth-borosilicate glass frit sold by GCC This invention's above-mentioned lowered "improved" glass frit maturation temperature is an added advantage of this current invention over other similar products. This improvement would in turn allow for the utilization of a higher percentage of pigmentation, as well as the addition of other compounds that are deemed necessary to help in attaining certain properties required for the enamels specific application. This improvement, in addition to the deliberate addition of optional coloring oxides, allows the invention to attain a "darker-black" for many of its embodiments. It must be noted that in the automotive industry, such "darker-black"has become the preferred color for automotive windows' outer perimeter band.

Those formulations of glass enamel frits are produced using conventional techniques. Such techniques include ball milling the melted compositions in a water solution to obtain an average particle size of from about 3.5 microns to about 7.5 microns as determined by a MICROTRAC® laser diffraction particle size analyzer at a 50% range. The slurry or solution of the milled glass frit is then dried utilizing one of the techniques that are well known to those skilled in the art.

The glass enamel portion in this invention includes the utilization of one or more of the glass fluxes described above in the making of enamel to suit the intended application. An enamel paste can be made by adding the dry flux or fluxes and other needed pigments into a conventional screen printing medium/vehicle. The present invention includes the utilization of other media as well. The medium of choice depends on the particular application technique being used. In addition to conventional media, the enamel may be prepared in different media including water-miscible media, thermoplastic media, spray media, roller-coater media, pad-transfer media, and UV-curable media (and mixtures thereof). Typical examples of such media are two known commercially as C474 and C487, manufactured and sold by GCC. Such enamel paste is then applied to the glass substrate, usually a flat substrate, via screen printing or other application method. Again, such techniques are well known to those skilled in the art. The product of this invention is suitable for various commercial glass coating applications in the automotive industry. Keeping in mind that other similar applications, such as appliances and architectures, can also utilize the products of such invention. Such applications include, but are not limited to, refrigerator shelves and other appliance glassware, furniture glass, indoor glass barriers, including satin etches for walkways, shower doors and shower boards and the like.

Those compositions provide improved chemical durability and completely suitable product(s) for their intended use. For example, the enamels herein may be used for automotive windows, including backlites, windshields and sidelites. Chemical durability evaluations of several acids were done for enamel product(s) of this invention compared with a typical lead-free, non-durable, zinc-borosilicate glass enamel, and a typical lead-free, semi-durable, bismuth-borosilicate glass enamel. Both products that were compared to the present invention are made and sold by GCC.

The procedures mentioned next were used for the evaluations. The following table illustrates the results of those evaluations. The citric acid evaluations were carried out and graded in accordance with the ASTM C724-91 test procedure. The 0.1 N $H_2SO_4$ sulfuric acid evaluations were done by immersion into the mentioned acid for the specified length of time. The grading was, again, done based on the following ASTM C724-91 grading scale:

| | |
|---|---|
| Grade 1 = | no attack apparent |
| Grade 2 = | appearance of iridescence or visible stain on the exposed surface when viewed at a 45% angle, but not apparent at angles less then 30% |
| Grade 3 = | definite stain which does not blur reflected images and is visible at angles less then 30% |
| Grade 4 = | definite stain with a gross color change or strongly iridescent surface visible at angles less than 30% and which may blur reflected images |
| Grade 5 = | surface dull or matte with chalking possible |
| Grade 6 = | significant removal of enamel with pinholing evident |
| Grade 7 = | complete removal of enamel in exposed area |

The results are summarized in the following table:

| | Acid Type/Exposure Time, at Room Temperature | |
|---|---|---|
| Product Type | 10% Citric Acid/ 15 minutes | 0.1 N $H_2SO_4$/ 2 hours |
| Currently available GCC Bismuth-based frit** | 4-5 | 4-5 |
| Currently available GCC zinc-based frit*** | 5-6 | 7 |
| Product(s) of current invention | 1 | 1-2 |

Test done according to ASTM Test Procedure C724-91
**GF-598, lead-free, semi-durable, Bismuth-borosilicate glass frit, sold by GCC
***GF-584, lead-free, non-durable, Zinc-borosilicate glass frit, sold by GCC The pigment interactions with the glass powders of the current invention are important to achieve the proper gloss and nonstick properties of the final product. "Nonstick" implies that the enamel as it is applied to the automotive glass substrate and the like should release and not stick to the mold that is used to press the glass piece into the desired curvature. In addition, the utilization of the technology defined in U.S. Provisional Patent Application Serial No. 60/658,510, Core-Shell Composite Inorganic Pigments and Method of Preparation for Crystallizable Glass Frit Compositions, could be advantageous as it has shown favorable results in comparable Bismuth-borosilicate glass frit systems.

The "powdered fluxes" of the present invention range from non-crystallizing or clear glasses to crystallizable glasses. Many can be described as partially crystallizing glasses. Furthermore, the compositions of this invention, regardless of their degree of crystallinity, are affected positively by the addition of various known pigments. This phenomenon is observed as a mattness or significant decrease in the gloss value of fired glass enamel. Such crystallization or partial crystallization is favored for the automotive glass enamels applied to glass surfaces subject to press molding to induce curvature or shape to a soften sheet of glass, where the softened sheet of glass must not show any sticking characteristics into the pressing mold. In other words, the mold which is covered with a flexible refractory pad must release completely from the enameled surface. Even though the addition of ceramic pigments to the glass enamel coating has long been used primarily for coloring purposes, those pigments and other modifications may have some additional beneficial and functional properties.

Another property that is important for industrial automotive glass enamel applications is the silver hiding property. "Silver hiding" refers to how well the bus bars of the defogger system grid are hidden by the black enamel band upon firing.

Several attempts have been made in the prior art toward eliminating the visibility of the defogger bus bar system from the outside of the automobile. Such prior art patents disclose altering the composition of the concerned automotive enamel. In particular, some prior art patents disclose the addition of a reducing agent such as powdered zinc, tin, cadmium, or manganese to the enamel to reduce the silver ions and inhibit silver migration. Other patents also suggest separate and distinct addition of silicon metal to the glass enamel in order help the silver hiding property. Such silicon additions are said to prevent sticking of the pressing mold to the paint or enamel. The present invention may be utilized in conjunction with the technology taught in U.S. Provisional Patent Application Serial No. 60/663,780, Silicon Alloys Materials as Silver Migration Inhibitors. This combination can be used to achieve the desired silver hiding.

The following tables give typical formulations of glass enamel compositions of the present invention. These examples only illustrate a small portion of the possibilities for such products.

|  | Enamel Formulation | | | |
| --- | --- | --- | --- | --- |
|  | A | B | C | D |
| Glass Flux 1* | 80.00 | 80.00 | | |
| Glass Flux 2* | | | 80.00 | 80.00 |
| Glass Flux 3** | | | | |
| Pigment 1*** | 20.00 | 14.00 | 11.00 | 14.00 |
| Pigment 2*** | | 5.00 | 8.00 | 5.00 |
| Others**** | | 1.00 | 1.00 | 1.00 |
| Total Solids | 100% | 100% | 100% | 100% |

*Flux made according to this invention
**Flux commercially available from GCC
***Pigments commercially available from Shepherd Color Company
****Modifiers used in this invention are available commercially available from Shepherd Color Company

|  | Enamel Formulation | | |
| --- | --- | --- | --- |
|  | E | F | G |
| Glass Flux 1* | 60.00 | 60.00 | 60.00 |
| Glass Flux 2* | 12.00 | 12.00 | 12.00 |
| Glass Flux 3** | 8.00 | 8.00 | 8.00 |
| Pigment 1*** | 20.00 | 14.00 | 14.00 |
| Pigment 2*** | | 5.00 | 4.00 |
| Others**** | | 1.00 | 2.00 |
| Total Solids | 100% | 100% | 100% |

*Flux made according to this invention
**Flux commercially available from GCC
***Pigments commercially available from Shepherd Color Company
****Modifiers used in this invention are available commercially available from Shepherd Color Company The present invention includes the utilization of one or more of the glass fluxes described above in the making of enamel to suit particular applications. An enamel paste can be made by adding the dry flux or fluxes and other needed pigments into a conventional screen printing vehicle. Such paste is then applied to the proper glass substrate, via screen printing. Again, such application techniques and variations thereafter are well known to those skilled in the art. The products of this invention are suitable for various commercial glass coatings applications.

It has also been discovered that utilizing frits made according to the present invention together with other known frits allows for use in additional applications to meet further application requirements. In addition to automotive applications, such "hybrid" products may be suitable for use in, e.g., appliance applications, and possibly others.

What is claimed is:

1. A lead-free, cadmium-free glass frit acceptable for use in automotive applications, consisting essentially of in percent by weight from about 8% to about 45% $SiO_2$, up to about 7% ZnO, up to about 4% $B_2O_3$, from about 40% to about 80% $Bi_2O_3$, up to about 4% $Na_2O$, up to about 8% $K_2O$, up to about 4% $Li_2O$, from about 0.1% to about 22% $Ta_2O_5$, up to about 1% $Nb_2O_5$, up to 4% of each of $Al_2O_3$, $TiO_2$, $ZrO_2$ and BaO, up to about 1% of each of SrO, $Sb_2O_3$, $Mo_2O_3$ MgO, $P_2O_5$ and CaO, up to about 3% $F_2$, and up to about 4% of one or more of $La_2O_3$, $Nd_2O_z$, $Pr_2O_3$ and $Ce_2O_3$.

2. The lead-free, cadmium-free composition according to claim 1 which includes in percent by weight from about 11% to about 35% $SiO_2$, from about 0.25% to about 5% ZnO, up to about 2% $B_2O_3$, up to about 2% $Na_2O$, from about 0.25% to about 2% BaO, up to about 2% of each of $TiO_2$ and $ZrO_2$, from about 0.1% to about 5% $K_2O$, from about 45% to about 75% $Bi_2O_3$, up to about 1% $Nb_2O_5$, from about 0.25% to about 2% $Li_2O$, from about 0.1% to about 16% of $Ta_2O_5$, from about 0.1% to about 2% $F_2$, and from about 0.1% to about 3% of one or more of $La_2O_3$, $Nd_2O_z$, $Pr_2O_3$ or $Ce_2O_3$.

3. The lead-free, cadmium-free composition according to claim 2 which includes in percent by weight from about 16% to about 25% $SiO_2$, from about 1% to about 4% ZnO, from about 0.25% to about 3% $K_2O$, from about 54% to about 71% $Bi_2O_3$, from about 0% to about 1% $Nb_2O_5$, from about 0.5% to about 1% $Li_2O$, from about 0.25% to about 11% of $Ta_2O_5$, from about 0.1% to about 1% $F_2$, from about 0.25% to about 1% $Al_2O_3$, from about 0.5% to about 1% BaO, and from about 0.25% to about 2% of one or more of $La_2O_3$, $Nd_2O_z$, $Pr_2O_3$ or $Ce_2O_3$.

4. The glass frit according to claim 1 which includes from about 0.25% to about 11% $Ta_2O_5$.

5. The glass frit according to claim 1 which includes from about 54% to about 71% $Bi_2O_3$.

6. The glass frit according to claim 3 which is substantially free of $Nb_2O_5$.

7. The glass frit according to claim 1 which is substantially free of $Nb_2O_5$.

8. A glass enamel composition comprising the glass frit composition according to claim 1.

9. A glass enamel composition comprising the glass frit composition according to claim 3.

10. A glass enamel composition comprising the glass frit composition according to claim 4.

11. A glass enamel composition comprising the glass frit composition according to claim 5.

12. A glass enamel composition comprising the glass frit composition according to claim 6.

13. A glass enamel composition comprising the glass frit composition according to claim 3 together with a medium selected from water miscible media, thermoplastic media, spray media, roller coater media, pad transfer media, UV curable media, and mixtures thereof.

14. A glass enamel composition comprising the glass frit composition according to claim 1 together with a medium selected from water miscible media, thermoplastic media, spray media, roller coater media, pad transfer media, UV curable media, and mixtures thereof.

* * * * *